(12) United States Patent
Settineri et al.

(10) Patent No.: US 9,010,513 B2
(45) Date of Patent: Apr. 21, 2015

(54) PNEUMATIC CLUTCH WITH IMPROVED CAPACITY AND LONGEVITY

(71) Applicants: Samuel E. Settineri, Marshall, MI (US); Vincent M. Tembreull, Cadillac, MI (US)

(72) Inventors: Samuel E. Settineri, Marshall, MI (US); Vincent M. Tembreull, Cadillac, MI (US)

(73) Assignee: BorgWarner Inc., Auburn Hills, MI (US)

( * ) Notice: Subject to any disclaimer, the term of this patent is extended or adjusted under 35 U.S.C. 154(b) by 0 days.

(21) Appl. No.: 13/938,969

(22) Filed: Jul. 10, 2013

(65) Prior Publication Data

US 2014/0014457 A1    Jan. 16, 2014

Related U.S. Application Data

(60) Provisional application No. 61/669,673, filed on Jul. 10, 2012.

(51) Int. Cl.
    *F16D 25/0632*    (2006.01)

(52) U.S. Cl.
    CPC .................................. *F16D 25/0632* (2013.01)

(58) Field of Classification Search
    CPC ............................ F16D 25/06; F16D 25/0632
    USPC .............. 192/192, 85.21, 89.27, 85.37, 66.22
    See application file for complete search history.

(56) References Cited

U.S. PATENT DOCUMENTS

| | | | | |
|---|---|---|---|---|
| 4,931,117 | A  * | 6/1990 | Muller et al. | 156/89.28 |
| 7,731,006 | B2 | 6/2010 | Settineri | |
| 8,360,219 | B2 * | 1/2013 | Swanson | 192/66.22 |
| 8,522,944 | B2 * | 9/2013 | Swanson et al. | 192/85.21 |
| 2007/0295575 | A1 * | 12/2007 | Turner | 192/85 CA |
| 2013/0140128 | A1 * | 6/2013 | Settineri | 192/85.21 |

* cited by examiner

*Primary Examiner* — Ramya Burgess
*Assistant Examiner* — Lillian Nguyen

(57) ABSTRACT

Pneumatic fan drive assembly with improved capacity, longevity and heat control. The output member is positioned radially internally of the output member. The friction mechanism has longer movement (moment) arms and torque. The friction engagement has an increased friction surface arm. A portion of the heat generated by the friction mechanism is evacuated to the atmosphere rather than being completely internalized in the assembly. The friction material for the friction lining alternatively can be formed of a plasma spray.

27 Claims, 3 Drawing Sheets

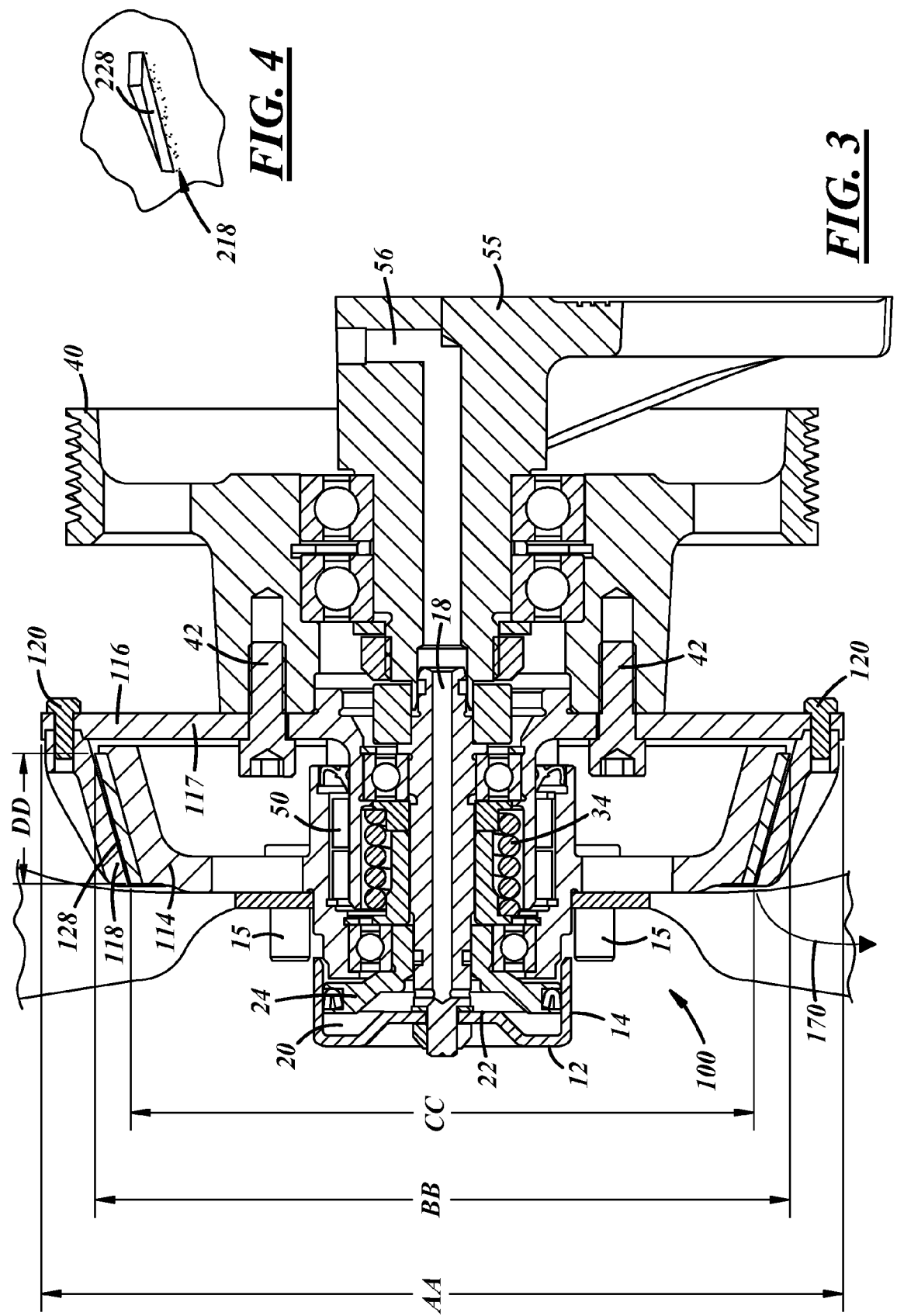

PNEUMATIC CLUTCH WITH IMPROVED CAPACITY AND LONGEVITY

CROSS REFERENCE TO RELATED APPLICATIONS

This application claims the benefit of U.S. Provisional Application Ser. No. 61/669,673, filed Jul. 10, 2012, which is incorporated herein by reference in its entirety.

TECHNICAL FIELD

The present invention relates generally to a pneumatic fan clutch and more particularly to a fan clutch which has improved capacity and longevity.

BACKGROUND OF THE INVENTION

Vehicle engines commonly utilize cooling assemblies to remove excess heat from the engine and maintain an optimal operating temperature. The cooling assembly pumps a coolant through the engine and other components in order to control engine temperature. Heat generated within the engine and other components is absorbed by the coolant and dispersed into the surrounding atmosphere through the use of a radiator. In order to improve dispersal by the radiator, it is common to utilize fan assemblies to draw or force air past the radiator to assist in temperature transmission.

It is not always desirable for such fan assemblies to be run continuously. At times, it is desirable for the temperature within the coolant to increase rather than decrease. Additionally, continuous operation when unnecessary places a non-required draw on the engine and thereby reduces efficiency. To compensate for this, present fan assemblies utilize fan clutch assemblies that allow for the selective engagement of the fan to the engine such that the fans are engaged only when necessary. The fan clutch assemblies may be operated in a host of configurations including hydraulic and air-pressure actuated. It is common for these systems to be biased towards fan operation such that when failure occurs in the clutch assembly, the fan continuously operates to keep the engine cool.

An issue with these fan assemblies and associated clutch assemblies relates to their capacity and longevity. Since space is often limited in vehicle engine compartments, it is important to supply a fan clutch which has as much capacity as possible for the size and space allowed in the component in the vehicle. Also due to warranty requirements and the expense required to replace components in a vehicle, it is important to provide a fan clutch which has increased durability and longevity—perhaps to last to the life of the engine or vehicle.

Another issue with current fan clutch assemblies relates to the amount of heat generated during use which also affects durability and longevity. In many known clutch assemblies, the heat generated from the friction clutch mechanism is internalized in the assembly. This can reduce the life of the friction member and the entire clutch assembly.

It would therefore be highly desirable to have an improved pneumatic clutch fan assembly with increased capacity and durability and without significantly changing its external size or shape. Another object would be to provide a fan assembly which operates in a cooler manner.

SUMMARY OF THE INVENTION

It is therefore an object to the present invention to provide a clutch assembly with increased capacity and durability and without significantly increasing its size or shape. It is further an object of the present invention to provide a clutch assembly which internalizes a smaller amount of the heat generated during use, and which is less expensive and easier to manufacture and assemble.

In accordance with the objects of the present invention, clutch assemblies are provided with improved structures and improved friction members, and with increased capacity and durability. A central piston chamber is positioned therein and feeds a pressure chamber. A translatable clutch piston is in communication with the pressure chamber and is movable between piston neutral and activated positions in response to air pressure fed into the pressure chamber. A rotating input drive member is provided along with a clutch housing. A cone clutch element translates between a clutch engaged position against a friction member to a clutch disengaged position in response to the clutch piston moving between the neutral and activated positions. The cone clutch element engages the rotating drive shaft when in the clutch engaged position. A clutch spring biases the cone clutch element towards the clutch engaged position with a clutch engagement force.

In one preferred embodiment of the invention, input and output members are provided with increased leverage ratios (from extended radial length) and increased surface area for the friction member, and without significantly changing the external size and shape of the clutch assembly. The housing and friction member (clutch output) are part of the smaller radial component, while the input drive member comprises the larger radial component. This provides a larger moment arm, as well as a new path for the frictional heat generated during use. The configuration allows heat generated from the friction clutch mechanism to pass to the ambient air. The ambient air provides for a second path of heat evacuation. Some heat will still be internalized in the clutch, but the path is longer and some of the heat will also be exhausted to the atmosphere. These features provide a fan clutch assembly with greater torque and capacity, as well as increased durability—and without necessarily changing the exterior size or shape of the clutch assembly.

A plasma spray friction material can also be provided as part of the friction engagement mechanism. A metal-based material in powder form is applied by a plasma spray or similar high velocity/high temperature deposition.

Since the inventive clutch assembly has more torque and durability, it can be used in more applications and with larger cooling fans.

Other objects and features of the present invention will become apparent when viewed in light of the detailed description and preferred embodiments when taken in conjunction with the attached drawings and claims.

BRIEF DESCRIPTION OF THE DRAWINGS

FIG. 3 illustrates the cone clutch fan drive of FIG. 2 with the clutch assembly illustrated in the clutch disengaged position; and.

FIG. 4 illustrates an alternate friction member which can be utilized with an embodiment of the invention.

DESCRIPTION OF PREFERRED EMBODIMENTS

Figure 1:
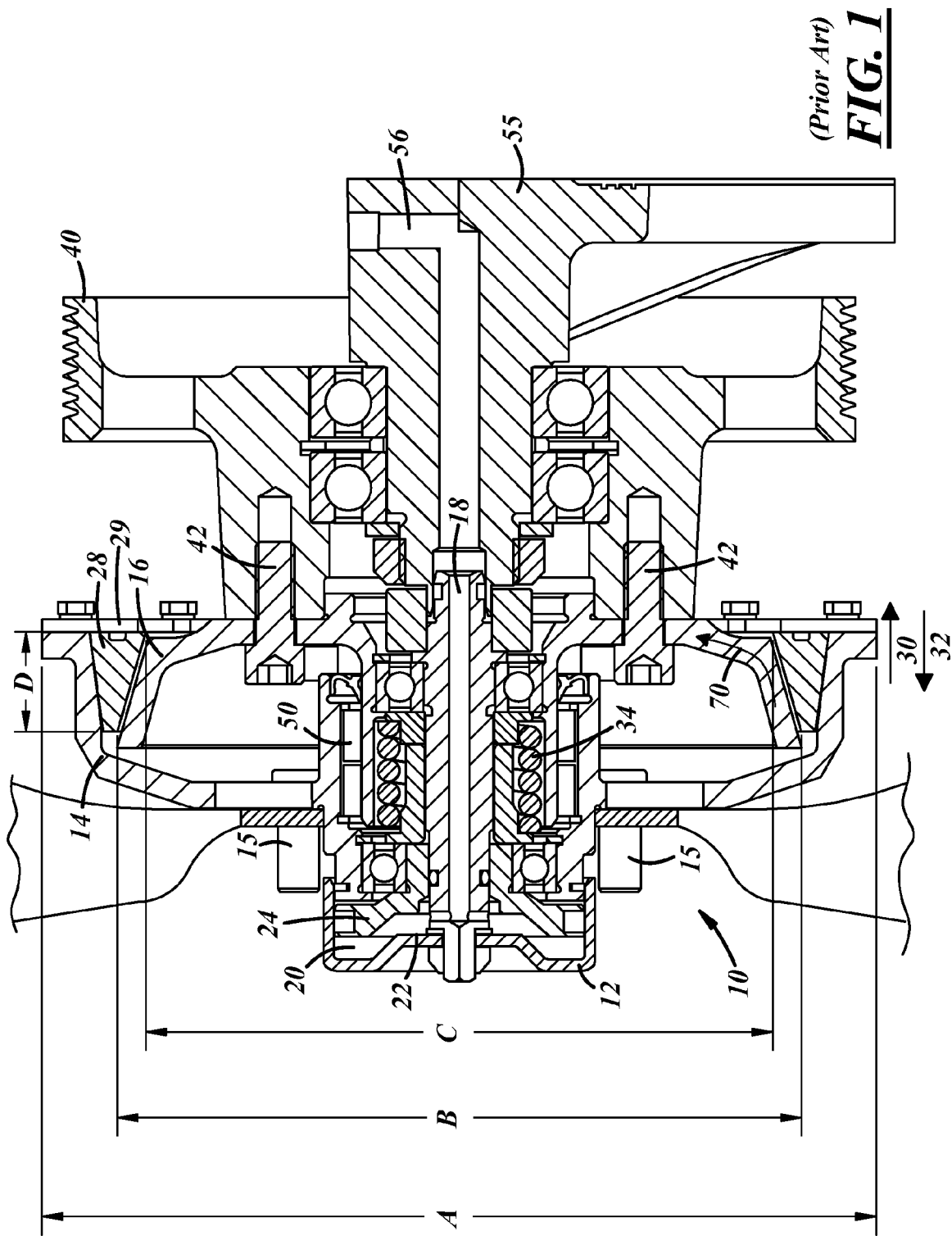
FIG. 1 depicts a prior art cone clutch fan drive assembly.

FIG. 1 depicts a cone clutch fan drive assembly 10 of a type known in the industry. The fan drive assembly 10 includes a clutch assembly 12 having a clutch housing 14. The present invention provides novel and valuable improvements to such clutch assemblies that provides increased torque, capacity, and durability, as well as less heat buildup, without significantly changing the exterior size and configuration of the assembly.

The components and operation of the clutch assembly 12 are similar to the clutch assemblies shown and described in U.S. patent application Ser. No. 10/905,505 entitled "Reduced Axial Length Air Actuated Cone Clutch Fan Drive," now abandoned, and U.S. Pat. No. 7,731,006. Thus, many of the components contained in the clutch assembly utilized herewith, as well as the basic operation thereof, do not need to be discussed and reference is made to these two references for a further discussion and description of them.

The clutch actuating assembly 12 includes a central piston chamber 18 positioned within the chamber cap 22. Preferably positioned along the centerline of the drive assembly 10, the central piston chamber 18 provides a pathway through the clutch actuating assembly 12 through which pressurized air may be selectively passed. The pressurized air passes through the central piston chamber 18 and into a pressure chamber 20 formed between a chamber cap 22 and a translatable clutch piston 24. When air pressure is supplied, the pressure chamber 20 becomes pressurized and the translatable clutch piston 24 is moved into a clutch disengaged position. In this position, the translatable clutch piston 24, is in operable communication with a cone-shaped clutch friction member 28. The friction member typically has an annular wedge shape and is securely affixed to the housing member 14. As piston member 24 is forced in the direction of arrow 30, the clutch is in its disengaged position. When in its disengaged position, the cone clutch friction member 28 disengages from the rotating input member 16 such that the input member 16 rotates independently from the cone clutch friction member 28.

The cone clutch friction member 28 travels axially only a small distance between the engaged and disengaged positions. In operation, the travel of the cone clutch friction member can be on the order of 0.05-0.15 inches.

A clutch spring 34 positioned within the clutch housing 14 biases the cone clutch friction member 28 towards a clutch engaged position (see arrow 32 in FIG. 1). When pressure within the pressure chamber 20 is released, the clutch spring 34 moves the cone clutch friction member 28 into the clutch engaged position and the translatable clutch piston 24 moves into the piston neutral position. The clutch spring 34 also provides a maximum spring force which in turn translates into a clutch engagement force between the cone clutch friction member 28 and the rotating input member 16. This force prevents slippage between the member 28 and the input member 16.

A needle bearing member 50 is positioned in between the rotating input member 16 and the cone clutch friction member 28. The needle bearing member 50 preferably is a dual needle bearing member as shown in FIG. 1.

In conventional air actuated cone clutches, such as the one shown in FIG. 1, the friction member 28 is a solid ring of friction material having a tapered or frustoconical annular shape. The friction member is held in place against the inner surface of the outer drum housing member 14. The friction material can be made of any conventional friction liner material and be allowed to float against retainer plates 29, or be secured in any conventional manner, such as by bonding. The friction member can also have a continuous 360° piece of friction material, or segmented into numerous pieces or sections, which is/are attached to a wedge shaped member.

As an alternate embodiment, it is also possible to mount or attach the friction member or friction liner to the radially outer surface of the input drive member 16.

The housing 14 is the output member of the fan assembly 10 and has a fan member or the like (not shown) attached to its front axial end (the left end in FIG. 1). The fan is attached to the housing by a series of bolts 15. The input drive member 16 is directly connected to the input pulley member 40. A plurality of bolts 42 attach the pulley member 40 to the input member 16. The pulley member is attached to an engine belt (not shown) which is driven by the engine essentially at or close to the engine RPM speed.

In known clutch assemblies, the input member 16 is positioned radially inside the housing 14. This structure is shown in FIG. 1. The frustoconical cone friction member 28 has its larger diameter end positioned facing the fan member end of the fan assembly and facing axially away from the pulley member 40.

An actual known fan assembly of the type shown in FIG. 1 is a Model K-30 clutch made and sold by BorgWarner Inc., Auburn Hills, Mich. The dimensions of a popular K-30 model are as follows: a radially outer housing diameter A of 200.8 mm (7.9 inches), a radially outer friction member diameter B of 164.25 mm (6.47 inches), a radially inner friction member diameter C of 151.2 mm (5.95 inches), and an axial length D of the cone-shaped friction member 28 of 24.4 mm (0.96 inches). If the average diameter of the friction member (about 157.7 mm-6.21 inches) is multiplied by pi (3.1416) and also multiplied by its axial length of D, the result is about 18.7 sq. inches of friction member surface. Also, the ratio of the outer diameter B of the friction member (164.25 mm-6.47 inches) to the outer diameter A of the fan assembly (200.8 mm-7.9 inches) is about 82%.

Figure 2:
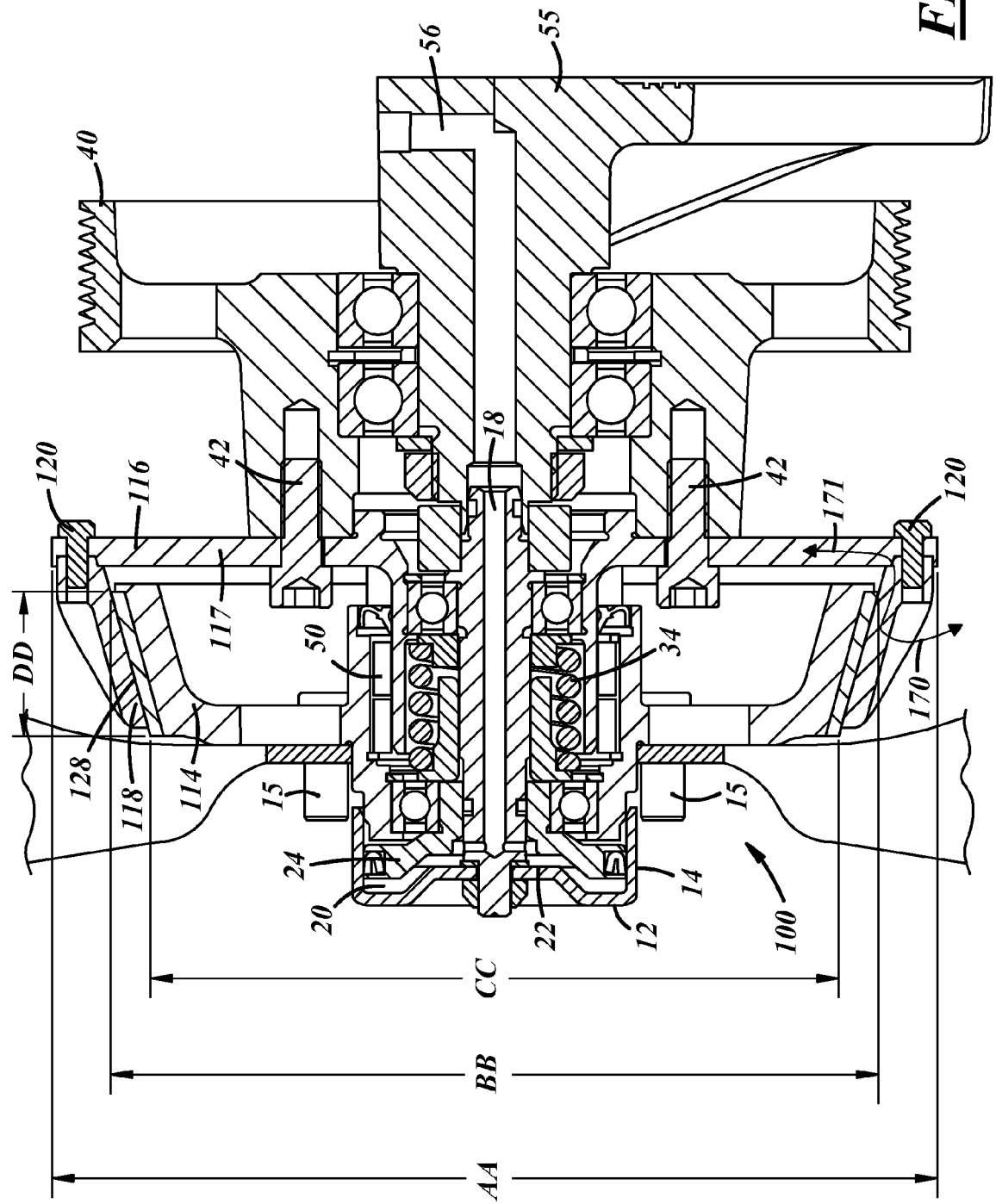
FIG. 2 illustrates a cone clutch fan drive in accordance with a first embodiment of the present invention, the clutch assembly illustrated in the clutch engaged position.

FIGS. 2 and 3 illustrate an embodiment of the present invention. The structure of fan assembly 100 is the same in FIGS. 2 and 3, with the difference being that the fan assembly in FIG. 2 is shown in the engaged position, while the fan assembly in FIG. 3 is shown in the disengaged position. (The gap between the friction member and drive member is exaggerated in the drawings for clarity.)

Also, where the components of the fan assembly shown in FIGS. 2 and 3 are the same as those shown in FIG. 1, the components are referred to by the same reference number. In all the Figures, the fan assemblies and pulley are attached to a mounting member 55 which is securely mounted to a vehicle in a conventional manner. Pneumatic pressure used to operate the fan assembly is also supplied to the assemblies 10 and 100 through passageways 56 in the mounting member 55.

An improvement of the invention over the prior art relates to the radially outer portions of the housing member 114 (which is the output member) and radially outer portion of the input drive member 116. With preferred embodiments of the present invention, the housing member 114 and friction member 128, which are part of the output of the fan clutch assembly, are part of the smaller radial component. As shown, the input member 116 is preferably wrapped around and over the output member becoming the larger radial component. This results in a larger moment arm, as well as a new path for frictional heat losses directly to the ambient air.

In the prior art fan assemblies, as shown in FIG. 1, the heat created by the frictional clutch engagement is directed radially inwardly into the internal portions of the fan assembly. See arrow 70 in FIG. 1. This creates additional heat for the fan assembly which is undesirable.

The improvement in heat dispersement from a pneumatic fan drive mechanism in accordance with the present invention is shown by a comparison of arrows 70 and 170-171 in FIGS.

1 and 2, respectively. In the prior art fan drive mechanism, most of the heat generated by the friction clutch mechanism is contained internally through the input member 16, as shown by arrow 70. This increases the heat of the entire assembly 10. In contrast, with the embodiment of the present invention as shown in FIGS. 2 and FIG. 3, a large portion of the heat generated by the friction clutch mechanism is dissipated into the atmosphere or ambient air, as shown by arrow 170. This maintains the friction clutch mechanism and entire fan drive assembly at a lower temperature.

The input drive member 116 can be made of a single piece, but preferably, as shown in FIGS. 2 and 3, the input drive member 116 is comprised of two parts, a radially oriented inner component 117 and an outer axial oriented component 118. The two components can be held together in any manner, such as by bolts or fasteners 120.

The friction member 128 is shown being attached to the radial outer surface of the output drive member 114. It is also possible, however, for the friction member to be attached to the radially inner surface of the input member 116.

In FIGS. 2 and 3, the frustoconical cone frictional member is situated in a position reverse to the friction cone member in FIG. 1. In FIGS. 2 and 3, the larger diameter end of the cone is axially positioned facing the pulley member 40 of the fan assembly and facing away from the fan member.

The present invention provides a friction member which is positioned at a radial distance from the centerline of the fan assembly greater than the radial distance of the friction member in the prior art. This creates a larger moment arm which in turn results in greater torque for engaging the frictional engagement. In addition, the surface area of the friction member 128 is greater in surface area than the surface area of the friction member 28 in the prior art which creates greater frictional engagement.

To illustrate this feature and its advantages, as an example, assume that the fan drive assembly 100 has essentially the same diameter AA as the radially outer diameter A of the fan drive assembly 10 in FIG. 1. Thus, the embodiment of the invention as shown in FIGS. 2 and 3 substantially corresponds to the size and shape of the prior art fan drive assembly. As indicated above, the outer diameter A of the fan assembly in FIG. 1 is 200.8 mm (7.9 inches). In the embodiment shown in FIGS. 2 and 3, the outer diameter AA is 201 mm (7.9 inches).

Even though the outer dimensions of the two fan assemblies are substantially the same, the friction member is spaced radially further away from the centerline of the assembly. Also, the friction member surface area is significantly greater. In FIGS. 2 and 3 with the outer assembly diameter of 201 mm (7.9 inches), the radially outer friction member diameter BB is 176.6 mm (6.94 inches), the radially inner friction member diameter CC is 158 mm (6.23 inches), and the axial length DD of the friction member is 33.7 mm (1.33 inches).

In comparison with the prior art assembly in FIG. 1 of comparable size and shape, the present invention provides a friction member which has about 38% more frictional surface area and about an 8% larger torque (moment) arm (87% vs. 82%). With more frictional engagement area, the working area for the friction member 118 is significantly larger than the prior art which spreads out the energy. This reduces the amount of heat per unit area generated by the friction member and also increases its durability and life. The longer moment arm creates more torque to frictionally engage the output member to the input member.

In the FIG. 1 assembly, the ratio of the surface area of the friction member (18.7 square inches) to the maximum outer diameter A (7.9 inches) is about 2.4, while in the FIG. 2 assembly the ratio of the friction member (27.6 square inches) to the maximum outer diameter AA (7.9 inches) is 3.3. A ratio of about 3.0 or greater is preferred.

The increase in the length of the moment arm for the frictional engagement of the clutch creates more torque. This means that less force is necessary to engage the friction member for the same amount of desired fan speed.

As indicated, due to the structure and construction of the friction member 128, it is greater in functional diameter and radial distance than friction members used in similarly sized and shaped prior art pneumatic clutches, such as friction member 28 in FIG. 1. This in turn allows the diameter of the mating faces of the input and output members to be increased resulting in a clutch assembly with increased strength and torque in the same size and shape package.

The increase in torque is shown by the following formula:

$$\text{Torque} = \frac{(\mu \cdot F)}{2(\sin\alpha)} \times \frac{(D+d)}{2}$$

where μ is the coefficient of friction, F is the normal force, α is the friction angle, D is the major contact diameter, and d is the minor contact diameter.

Any increase in the length of the moment arm can be significant. However, for optimum torque for engagement of the friction member, an increase in length of at least 2-5% is preferred. As indicated above, with the embodiment shown in FIGS. 2 and 3, the increase in the length of the moment arm is 8%.

With increased torque, the present invention can be used in more fan and cooling applications. The inventive fan assembly can be utilized with larger cooling fans and larger cooling systems, but with a fan assembly having the same size and configuration as the prior art.

Also, any increase in the frictional surface area of the friction member can be significant. For purposes of the present invention, an increase of at least 10-15% is preferred. As indicated above, with the embodiment shown in FIGS. 2 and 3, the increase in the surface area of the cone shaped friction member relative to the FIG. 1 prior art is about 47%. This feature also allows fan assemblies which utilize the present invention to be used in more applications and with cooling fans of larger size and diameter.

Another embodiment of the invention is shown in FIG. 4. In this embodiment, the friction material 218 positioned on the friction member 228, is a substrate formed by a plasma spray or similar high voltage/high temperature deposition. The substrate is preferably formed from a metal based friction material in powder form. The high temperature application processes resulted in melted particles which the high velocity achieves a good densification and packing of the particles to the friction member surface. A wide variety of thermal spray technologies can be used, although higher velocity versions, such as HVOF (high velocity oxygen fuel), are believed to have very good densifications.

The standard method of getting high performance metal based friction material from powder form to a pad of material that's bonded to a substrate is a) deposit powder into a molding die, b) apply high pressure to pack powder together, c) bake the packed powder shape at very high temperature so particles melt together, and d) bond the baked shape to s substrate via adhesives or other mechanical techniques such as rivets. All four steps can be combined into one by using a thermal/mechanical spray process such as plasma spray.

Typically, plasma spray is used to prevent wear by depositing very hard materials to a substrate. In this invention, the deposited material is being used to create friction rather than avoid wear.

With this embodiment of the invention, the spraying medium can be a composite of many ingredients rather than a typical spray of homogeneous mixture. Due to being a composite mix, some of the particles may not melt as easily as other components in the mix, yielding a final substrate layer that's not only different in chemistries, but also different in phase structures. Adjoining lower melt particles will act as binders to the higher melt particles that may not have adhered as well in the melted matrix.

Particle size of the various powder components as well as temperatures and velocities can be optimized for each application and powder mix.

For the fan drive application shown, the substrate is a cone clutch. Attaching metal based material, such as sintered copper brake pad, is very difficult and costly when using known technologies as outlined above. The new process alleviates the need to use adhesives, rivers or other specialized fixturing to bond the sintered copper material to an aluminum or steel substrate.

Any material exhibiting a tendency to melt and bond together when physically launched onto a substrate can be used. One example comprises steel and copper based, however, certain lower melt organic materials may work depending on the friction material mix.

While the invention has been described in connection with one or more embodiments, it is to be understood that the specific mechanisms and techniques which have been described are merely illustrative of the principles of the invention, numerous modifications may be made to the methods and apparatus described without departing from the spirit and scope of the invention as defined by the appended claims.

What is claimed is:

1. A pneumatic clutch assembly for a fan drive system of an engine comprising:
   a clutch housing,
   a central piston chamber feeding a pressure chamber;
   a translatable clutch piston positioned within said clutch housing and in communication with said pressure chamber, said translatable clutch piston movable between a piston neutral position and a piston activated position, wherein air pressure fed through said central piston chamber into said pressure chamber moves said translatable clutch piston between said piston neutral position to said piston activated position;
   an output friction clutch portion positioned on the radially distal end of said clutch housing;
   a rotating input drive member connected to a drive pulley member and having a distal input friction clutch portion positioned radially outwardly of said output friction clutch portion on said clutch housing;
   a cone clutch friction member in communication with said translatable clutch piston such that said cone clutch friction member is moved from a clutch engaged position to a clutch disengaged position in response to said translatable clutch piston moving from said piston neutral position to said piston activated position, and
   a clutch spring positioned between said rotating input drive member and said cone clutch friction member, said clutch spring biasing said cone clutch friction member into said clutch engaged position with a clutch engagement force.

2. The clutch assembly as described in claim 1 wherein said cone clutch friction member has a frustoconical shape and the largest diameter end of said cone clutch axially faces in the direction of said input drive member.

3. The clutch fan assembly as described in claim 1, wherein said friction member is made of a plasma spray material.

4. The clutch fan assembly as described in claim 1, wherein said input drive member comprises a first radial extending portion and said distal input friction clutch portion extends generally in the axial direction.

5. The clutch fan assembly as described in claim 4 wherein the maximum radial diameter of said output friction clutch portion being at least about 85% of the maximum radial diameter of said input friction clutch portion.

6. The clutch fan assembly as described in claim 1, further comprising a fan member, said fan member connected to said clutch housing which is an output member.

7. The clutch fan assembly as described in claim 1, wherein contact surfaces on said input and output friction clutch portions have surface areas which are at least 10% greater than friction contact surfaces for known clutch fan assemblies having substantially the same exterior size and configuration.

8. The fan clutch assembly as described in claim 7 wherein the ratio of said frictional contact surface area to maximum outer diameter of said clutch assembly is at least 3.0.

9. A clutch assembly for a fan drive system of an engine comprising:
   a rotatable clutch housing, said clutch housing comprising an output friction clutch portion for the fan drive system;
   a fan member connected to said clutch housing and rotatable therewith;
   a central piston chamber feeding a pressure chamber;
   a translatable clutch piston positioned within said clutch housing and in communication with said pressure chamber, said translatable clutch piston movable between a piston neutral position and a piston activated position, wherein air pressure fed through said central piston chamber into said pressure chamber moves said translatable clutch piston between said piston neutral position to said piston activated position;
   a rotating input drive member having a generally radially extending input friction clutch portion positioned radially outwardly of said output friction clutch portion on said clutch housing;
   said clutch housing in communication with said translatable clutch piston such that said output clutch friction portion is moved from a clutch engaged position to a clutch disengaged position in response to said translatable clutch piston moving from said piston neutral position to said piston activated position, said output clutch friction portion engaging said rotating input friction clutch portion when in said clutch engaged position;
   a clutch spring positioned between said rotating input friction clutch and said clutch housing, said clutch spring biasing said output clutch friction portion into said clutch engaged position with a clutch engagement force, said output clutch friction portion having a frustoconical configuration with the longer radial end facing said input drive member.

10. The clutch assembly as described in claim 9, wherein said input drive member is connected to a drive pulley member and rotatable therewith.

11. The clutch assembly as described in claim 9, wherein said input friction clutch portion and/or said output friction clutch portion comprises a plasma spray material.

12. The clutch assembly as described in claim 9, wherein said input drive member comprises a first radial extending portion and said input friction clutch portion on said distal end thereof extends generally in an axial direction.

13. The clutch assembly as described in claim 9 wherein each of said input friction clutch portion and said output friction clutch portion have a friction engagement contact area, and the ratio of such surface contact areas to the maximum outer diameter of said clutch assembly is at least 3.0.

14. The clutch drive mechanism as described in claim 9 wherein said clutch piston member is a pneumatically operated piston member.

15. A method of operating a clutch fan assembly for use in a fan drive system of an engine comprising:
   providing a clutch housing member having a distally positioned first friction clutch member;
   positioning a central pressure chamber within said clutch housing;
   moving a translatable clutch piston member positioned within said clutch housing and in communication with said pressure chamber between a piston neutral position and a piston activated position by way of air pressure fed through said central piston chamber into said pressure chamber;
   rotating an input drive member by a pulley member, said input drive member having a second friction member extending radially outwardly beyond said first friction clutch member;
   moving said first friction clutch member from a clutch engaged position to a clutch disengaged position in response to said translatable clutch piston moving from said piston neutral position to said piston activated position;
   engaging said rotating second friction clutch member with said first friction clutch member when in said clutch engaged position; and
   biasing said second friction clutch into said clutch engaged position with a clutch spring positioned in said clutch housing.

16. The method as described in claim 15 further comprising plasma spraying friction materials on said first clutch friction member and/or said second friction clutch member.

17. The clutch drive mechanism as described in claim 15 wherein said clutch piston member is a pneumatically operated piston member.

18. A clutch drive mechanism for a cooling fan comprising:
   a housing member comprising a piston housing member and a radially extending output member;
   a fan member attached to said housing member;
   an output friction clutch member positioned on the distal end of said output member;
   a biased clutch piston member positioned in said piston housing member;
   an input drive member attached to a pulley member and comprising a radially extending input member;
   an input fraction clutch member positioned at the distal end of said input member;
   said input friction clutch member positioned radially outwardly of said output friction clutch member;
   wherein activation of said clutch piston member prevents engagement of said input friction clutch member and said output friction clutch member; and
   wherein deactivation of said clutch piston member allows engagement of said input friction clutch member and said output friction clutch member, wherein rotation of said fan member is secured.

19. The clutch drive mechanism as described in claim 18 wherein friction lining material is positioned on either said input friction clutch member or said output friction clutch member.

20. The clutch drive mechanism as described in claim 19 wherein said friction lining material comprises a plasma spray material.

21. The clutch drive mechanism as described in claim 18 wherein friction lining material is positioned on both of said input friction clutch member and said output friction clutch member.

22. The clutch drive mechanism as described in claim 21 wherein said friction lining material comprises a plasma spray material.

23. The clutch drive mechanism as described in claim 18 further comprising a mounting member, and wherein said housing member is rotatably attached to said mounting member.

24. The clutch drive mechanism as described in claim 23 wherein said clutch piston member is fixedly secured to said mounting member.

25. The clutch drive mechanism as described in claim 18 further comprising a mounting member, and wherein said pulley member is rotatably positioned on said mounting member.

26. The clutch drive mechanism as in described in claim 18 wherein said piston member housing is rotatably positioned around said clutch piston member.

27. The clutch drive mechanism as described in claim 18 wherein said clutch piston member is a pneumatically operated piston member.

* * * * *